US008314958B2

United States Patent
Atobe (10) Patent No.: US 8,314,958 B2
(45) Date of Patent: Nov. 20, 2012

(54) COMMUNICATION SYSTEM, IMAGE PROCESSING APPARATUS, IMAGE PROCESSING METHOD, AUTHENTICATION SERVER, IMAGE MANAGING METHOD, IMAGE MANAGING PROGRAM, AND IMAGE PROCESSING SYSTEM

(75) Inventor: Hiroshi Atobe, Richmond (GB)

(73) Assignee: Canon Kabushiki Kaisha (JP)

( * ) Notice: Subject to any disclaimer, the term of this patent is extended or adjusted under 35 U.S.C. 154(b) by 2117 days.

(21) Appl. No.: 11/150,859

(22) Filed: Jun. 10, 2005

(65) Prior Publication Data
US 2006/0015734 A1    Jan. 19, 2006

(30) Foreign Application Priority Data
Jun. 11, 2004    (JP) .................................. 2004-174489

(51) Int. Cl.
*H04N 1/60*    (2006.01)
(52) U.S. Cl. ...................................... 358/1.15; 713/176
(58) Field of Classification Search ................... 358/1.1, 358/1.15, 1.13, 1.9, 1.14, 1.18
See application file for complete search history.

(56) References Cited

U.S. PATENT DOCUMENTS

| 7,113,291 | B1* | 9/2006 | Yamada et al. | 358/1.13 |
| 7,443,527 | B1* | 10/2008 | Shigeeda | 358/1.15 |
| 2004/0039926 | A1* | 2/2004 | Lambert | 713/189 |
| 2009/0100268 | A1* | 4/2009 | Garcia et al. | 713/184 |

FOREIGN PATENT DOCUMENTS

| JP | 2000-287009 A | 10/2000 |
| JP | 2001-51960 A | 2/2001 |
| JP | 2002-171400 A | 6/2002 |
| JP | 2004-94920 A | 3/2004 |

* cited by examiner

*Primary Examiner* — King Poon
*Assistant Examiner* — Iriana Cruz
(74) *Attorney, Agent, or Firm* — Rossi, Kimms & McDowell LLP

(57) ABSTRACT

A communication system which is capable of improving the security of a protected image. The protected image on which a predetermined protection process has been carried out and authentication information are transmitted from an information processing apparatus to an image processing apparatus and an authentication server, respectively. Permission information for permitting removal of the predetermined protection process is issued from the authentication server based on the authentication information, and is obtained by the image processing apparatus. When the protected image is subjected to predetermined image processing carried out by the image processing apparatus, the content of the predetermined image processing is regulated to within a predetermined range indicated by the permission information.

9 Claims, 9 Drawing Sheets

| RESTRICTED FUNCTION ITEMS | USER A | USER B | USER C |
|---|---|---|---|
| PRINT | ○ | ○ | × |
| HIGH-RESOLUTION PRINT | ○ | ○ | × |
| ENLARGED/REDUCED PRINT | ○ | × | × |
| COLOR PRINT | ○ | × | × |
| ADDITIONAL IMAGE PRINT (WATERMARK/BACKGROUND IMAGE) | ○ | ○ | × |
| UNRESTRICTED PRINT PERIOD | ○ | ○ | × |
| UNRESTRICTED PRINT NUMBER OF TIMES | ○ | × | × |
| DATA STORAGE | ○ | × | ○ |

COMMUNICATION SYSTEM, IMAGE PROCESSING APPARATUS, IMAGE PROCESSING METHOD, AUTHENTICATION SERVER, IMAGE MANAGING METHOD, IMAGE MANAGING PROGRAM, AND IMAGE PROCESSING SYSTEM

BACKGROUND OF THE INVENTION

1. Field of the Invention

The present invention relates to a communication system, an image processing apparatus, an image processing method, an authentication server, an image managing method, an image managing program, and an image processing system. In particular, the invention relates to a communication system, an image processing apparatus, an image processing method, an authentication server, an image managing method, an image managing program, and an image processing system that carry out predetermined image processing on a protected image that has been subjected to a predetermined protection process.

2. Description of the Related Art

Due to the development of application software that handles image data of digital images including digital photographs and advances in printing technology, the resolution of image data of digital images has become higher and the scale of the market for businesses based on digital images has been expanding year by year. Together with this, the volume of image data distributed onto the market has been increasing and the number of digital images available on the market has been increasing steadily.

For businesses based on digital images, a host, which includes a content management server for managing digital images, provides a client with an image processing system that offers users fee-based delivery services of image data. Using the image processing system, the client can release sample images produced by subjecting image data to a predetermined process to users. Each user can pay a predetermined fee to the client via the content management server. After password authentication, the user can download and thereby obtain the desired image data from the content management server. Note that a typical print authentication technology has been disclosed in Japanese Laid-Open Patent Publication (Kokai) No. 2004-094920.

However, once obtained after the password authentication, the image data can freely and easily be image-processed, for example, copied by the user. This makes it difficult for the client to protect the copyright of the distributed image data, resulting in lowered security of the image data.

Also, in the image processing system, the increased volume and number of image data makes the processing required for the content management server to perform to manage high-resolution image data increasingly complex, which increases the load upon the content management server for handling image data. In addition, the management of accounting information for respective image data and password authentication before downloading create a further load, and therefore, there is a demand to reduce such load to improve the performance of the image processing system.

SUMMARY OF THE INVENTION

It is a first object of the present invention to provide a communication system, an image processing apparatus, an image processing method, and an image processing system that can improve the security of a protected image.

It is a second object of the present invention to provide a communication system, an authentication server, an image managing method, an image managing program, and an image processing system that can improve the performance of an authentication server.

To attain the first and second objects, in a first aspect of the present invention, there is provided a communication system comprising an image processing apparatus that carries out predetermined image processing on a protected image on which a predetermined protection process has been carried out, an information processing apparatus that transfers the protected image to the image processing apparatus and causes the image processing apparatus to carry out image processing on the protected image, and an authentication server that issues permission information, wherein the information processing apparatus comprises an image transmitting device that transmits the protected image to the image processing apparatus, and an authentication information transmitting device that transmits the authentication information to the authentication server, the authentication server comprises an authentication information obtaining device that obtains the authentication information transmitted from the information processing apparatus, and an issuing device that issues the permission information for permitting removal of the predetermined protection process carried out on the protected image based on the obtained authentication information, and the image processing apparatus comprises an image obtaining device that obtains the protected image transmitted from the information processing apparatus, a permission information obtaining device that obtains the permission information issued by the issuing device of the authentication server, and a regulating device that regulates, based on the permission information obtained by the permission information obtaining device, a content of the predetermined image processing to within a predetermined range indicated by the permission information.

According to the above construction, since the content of the predetermined image processing is restricted to within a predetermined range permitted by the permission information based on user specifying information for specifying a user permitted to remove the predetermined protection process carried out on the protected image, the security of the protected image can be improved.

Also, according to the above construction, it is sufficient to transmit restriction information for restricting the predetermined image processing to within a predetermined range permitted by the permission information to the image processing apparatus, so that the performance of an authentication server can be improved.

To attain the first object, in a second aspect of the present invention, there is provided an image processing apparatus that is capable of communicating with an authentication server and carries out predetermined image processing on a protected image on which a predetermined protection process has been carried out, comprising a regulating device operable when the authentication server has issued permission information based on user specifying information for specifying a user permitted to remove the predetermined protection process carried out on the protected image, to regulate a content of the predetermined image processing to within a predetermined range permitted by the permission information.

Preferably, the image processing apparatus is connected to the authentication server that manages the protected image and to a selecting device that is connected to the authentication server and selects the image processing apparatus to carry out the predetermined image processing, and when the image processing apparatus is selected by the selecting device, the regulating device regulates the content based on regulation information for regulating the content of the predetermined image processing to within the predetermined range, the regulation information having been generated by the authentication server based on user specifying information for specifying the user received from the selecting device.

According to the above construction, since the authentication server generates the restriction information for restricting the content of the predetermined image processing to within a predetermined range, it is possible to reliably manage the security of the protected image. Since the selecting device transmits user information to the authentication server, the performance of the authentication server can be improved.

More preferably, the authentication server and the selecting device are connected to each other by a network using TCP (Transmission Control Protocol).

According to the above construction, the reliability of the transmission and reception of information can be improved.

More preferably, the selecting device comprises a specific function designating device that designates execution of a function that is specific to the selected image processing apparatus.

According to the above construction, it is no longer necessary for the authentication server to grasp the functions specific to the image processing apparatus, therefore the performance of the authentication server can be improved.

Also preferably, the predetermined image processing includes a print process, and the regulating device regulates execution of the print process so that execution of the print process is permitted for a predetermined user.

According to the above construction, the security relating to the print process can be reliably improved.

More preferably, the regulating device restricts an environment of the print process.

According to the above construction, the security can be more reliably improved.

Also preferably, the regulating device regulates a change in a print state of an image subjected to the print process.

According to the above construction, the security can be more reliably improved.

More preferably, the print state includes at least one of a resolution, an enlargement ratio/reduction ratio, color/monochrome, and presence/absence of an image to be added, for the image.

According to the above construction, the security can be more reliably improved.

More preferably, the image to be added includes at least one of a watermark and a background image.

According to the above construction, the security can be more reliably improved.

Also preferably, the regulating device restricts at least one of a time period and number of times for which the print process can be executed.

According to the above construction, the security can be more reliably improved.

Preferably, the predetermined image processing includes a storage process, and the regulation device regulates execution of the storage process so that execution of the storage process is permitted for a predetermined user.

According to the above construction, the security relating to the storage process can be reliably improved.

Preferably, the image processing apparatus comprises a protection process removing device that removes the protection process carried out on the protected image.

According to the above construction, the removal of the protection process can be carried out as necessary, and therefore the security can be improved reliably.

More preferably, when a function specific to the image processing apparatus for which an execution of the image processing has been designated is not within the predetermined range regulated by the regulating device, removal of the protection process by the protection process removing device is suspended.

According to the above construction, the security can be improved more reliably.

To attain the first object, in a third aspect of the present invention, there is provided an image processing method of carrying out, via an authentication server, predetermined image processing on a protected image on which a predetermined protection process has been carried out, comprising a regulating step of regulating a content of the predetermined image processing to within a predetermined range indicated by permission information when the authentication server issues the permission information based on user specifying information for specifying a user permitted to remove the predetermined protection process carried out on the protected image.

To attain the second object, in a fourth aspect of the present invention, there is provided an authentication server that is connected to an image processing apparatus, which carries out predetermined image processing on a protected image on which a predetermined protection process has been carried out, for managing the protected image, comprising an obtaining device that obtains user specifying information for specifying a user permitted to remove the predetermined protection process carried out on the protected image, a transfer device that issues permission information based on the user specifying information obtained by the obtaining device and transfers the permission information to the image processing apparatus, and a regulation information transmitting device that transmits regulation information for regulating a content of the predetermined image processing carried out by the image processing apparatus to within a predetermined range permitted by the permission information, to the image processing apparatus.

Preferably, the authentication server is connected to a selection device that selects the image processing apparatus, and the regulation information transmitting device comprises a regulation information generating device that generates the regulation information based on the permission information received by the authentication server from the selecting device.

More preferably, the selection device and the image processing apparatus are connected to each other by a network using TCP (Transmission Control Protocol), and the selection device comprises a specific function designating device that designates execution of a function that is specific to the selected image processing apparatus.

Preferably, the predetermined image processing includes a print process, and the regulation information includes print permission information for regulating execution of the print process so that execution of the print process is permitted for a predetermined user.

Preferably, the regulation information includes print environment restriction information for restricting an environment of the print process, and the regulation information includes print state changing information for regulating a change in a print state of an image subjected to the print process.

More preferably, the print state includes at least one of a resolution, an enlargement ratio/reduction ratio, color/monochrome, and a presence/absence of an image to be added, for the image.

Even yet more preferably, the image to be added includes at least one of a watermark and a background image.

More preferably, the regulation information includes restriction information for restricting at least one of a time period and number of times for which the print process can be executed.

Preferably, the predetermined image processing includes a storage process, and the regulation information includes storage permission information for regulating execution of the print process so that execution of the storage process is permitted for a predetermined user.

To attain the second object, in a fifth aspect of the present invention, there is provided an image managing method executed by an authentication server that is connected to an image processing apparatus, which carries out predetermined image processing on a protected image on which a predetermined protection process has been carried out, and that manages the protected image, comprising an obtaining step of obtaining user specifying information for specifying a user permitted to remove the predetermined protection process carried out on the protected image, a transfer step of issuing permission signal based on the user specifying information obtained in the obtaining step and transferring the permission information to the image processing apparatus, and a regulation information transmitting step of transmitting regulation information for regulating a content of the predetermined image processing carried out by the image processing apparatus to within a predetermined range permitted by the permission information, to the image processing apparatus.

To attain the second object, in a sixth aspect of the present invention, there is provided an image managing program for causing a computer to execute an image managing method executed by an authentication server that is connected to an image processing apparatus, which carries out predetermined image processing on a protected image on which a predetermined protection process has been carried out, and that manages the protected image, the image managing program comprising an obtaining module for obtaining user specifying information for specifying a user permitted to remove the predetermined protection process carried out on the protected image, a transfer module for issuing permission signal based on the user specifying information obtained by the obtaining module and transferring the permission information to the image processing apparatus, and a regulation information transmitting module for transmitting regulation information for regulating a content of the predetermined image processing carried out by the image processing apparatus to within a predetermined range permitted by the permission information, to the image processing apparatus.

To attain the first and second object, in a seventh aspect of the present invention, there is provided an image processing system comprising an authentication server that manages a protected image, and an image processing apparatus that is capable of communicating with the authentication server and carries out predetermined image processing on the protected image on which a predetermined protection process has been carried out, wherein the authentication server comprises an obtaining device that obtains user specifying information for specifying a user permitted to remove a predetermined protection process carried out on the protected image, a transfer device that issues permission information based on the user specifying information obtained by the obtaining device and transfers the permission information to the image processing apparatus, and a regulation information transmitting device that transmits regulation information for regulating a content of the predetermined image processing carried out by the image processing apparatus to within a predetermined range permitted by the permission information, to the image processing apparatus, and wherein the image processing apparatus comprises a regulating device that regulates the content of the image processing carried out to within a predetermined range permitted by the permission information, based on the regulation information.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing a preferred embodiment thereof.

Figure 1:
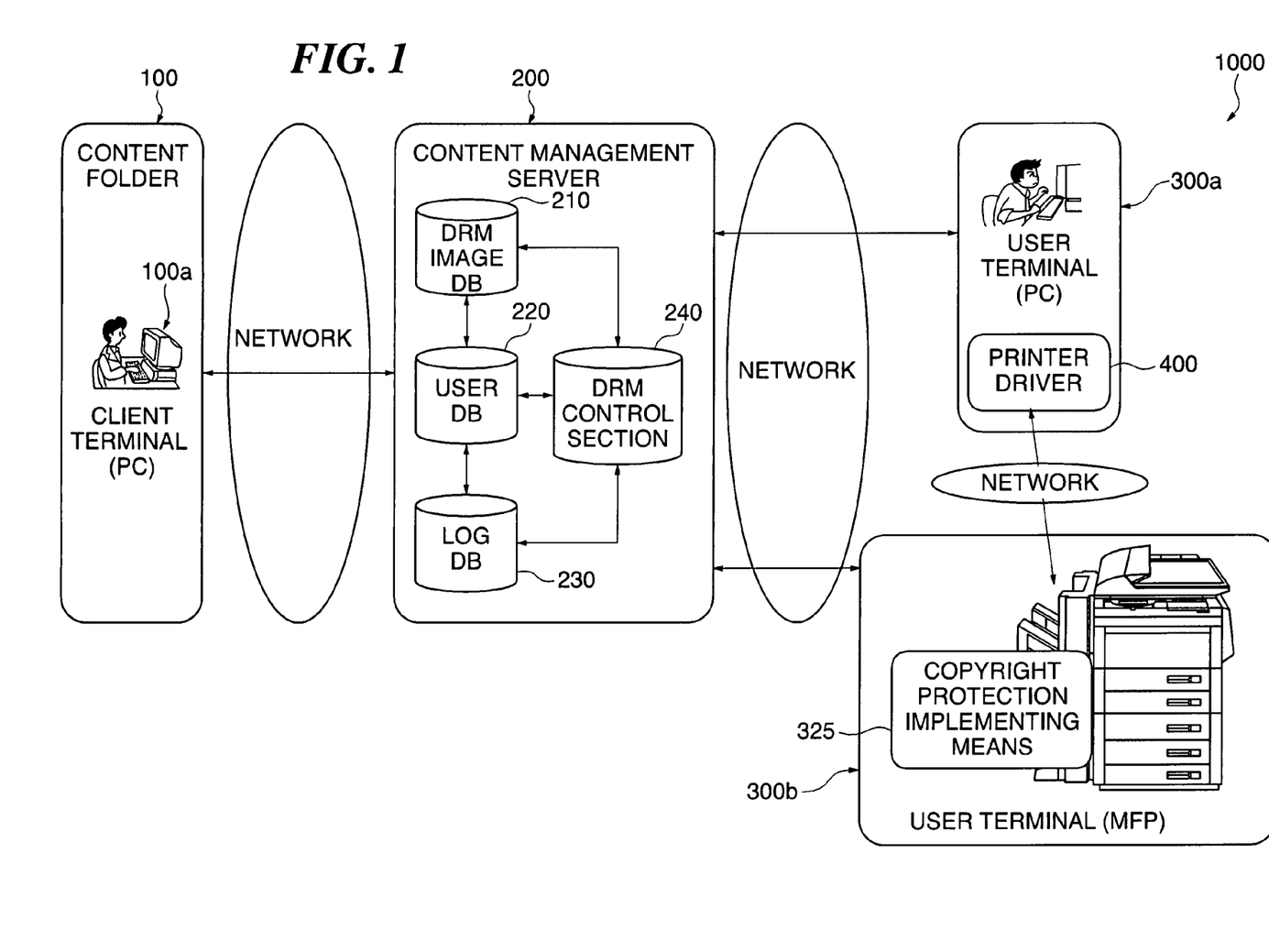
FIG. 1 is a block diagram schematically showing the construction of an image processing system (communication system) according to an embodiment of the present invention.

FIG. 1 is a block diagram schematically showing the construction of an image processing system (communication system) according to an embodiment of the present invention.

As shown in FIG. 1, a DRM (Digital Rights Management) system 1000 as an image processing system (communication system) is comprised of: a content folder 100 where a client stores digital image data ("contents") owned by the client in a personal computer (PC) 100*a* as a client terminal; a content management server (authentication server) 200 that implements copyright protection on image data, out of digital image data owned by the client, to be distributed to users to protect the copyright thereof, and also manages the protected image data (hereinafter referred to as "the DRM image data"); a personal computer (PC) 300*a* as a user terminal that stores DRM image data distributed from the client via the content management server 200; and a multifunction printer (MFP) 300*b* as a user terminal that stores and/or prints the DRM image data as print data outputted from the PC 300*a*.

The content management server 200 is connected via networks to the content folder 100 and the user terminals 300a, 300b. The PC 300a is also connected to the MFP 300b via a network. The PC 300a is also connected via a network to the PC 100a of the content folder 100.

The network between the content management server 200 and the user terminals 300a, 300b uses TCP (Transmission Control Protocol). The content management server 200 and the user terminals 300a, 300b are constructed so as to be capable of transmitting and receiving information to and from one another via e-mail. The use of TCP can improve the reliability of the information transmission and reception by communication between the content management server 200 and the user terminals 300a, 300b. The use of e-mail can simplify the information transmission and reception by communication between the content management server 200 and the user terminals 300a, 300b.

The PC 300a has installed therein a printer driver 400 shown in FIG. 2, described later. Via the printer driver 400, the user outputs the DRM image data to be printed as print data to the MFP 300b, informs the MFP 300b of sheet feeding position, resolution, sheet size, and sheet discharging position, and informs the MFP 300b of a type of a finishing process (i.e., execution of functions such as a sort process, a staple process, and a binding print process that are specific to the MFP 300b).

The MFP 300b is an image processing apparatus including a copyright protection implementing means 325, described later and shown in FIG. 3. In addition to the print function and the e-mail transmission/reception function mentioned above, the MFP 300b includes "DRM image data storage", "copy", "FAX transmission/reception", and "scan" functions. In addition, the MFP 300b can be provided with a variety of sheet feeding/discharging options that are specific to the MFP 300b. Functions based on such options are carried out in accordance with instructions from the printer driver 400.

As shown in FIG. 1, the content management server 200 is comprised of a DRM image database (DB), a user DB 220, a log DB 230, and a DRM controller 240 connected to these DBs. The DRM controller 240 controls the entire operation of the content management server 200.

In the DRM image DB 210, DRM image data to be distributed by the client to users is registered together with accounting information therefor. The accounting information is set by the client to inform users of the price of purchasing DRM image data, a purchasing method for the DRM image data, and the like.

Figure 5:
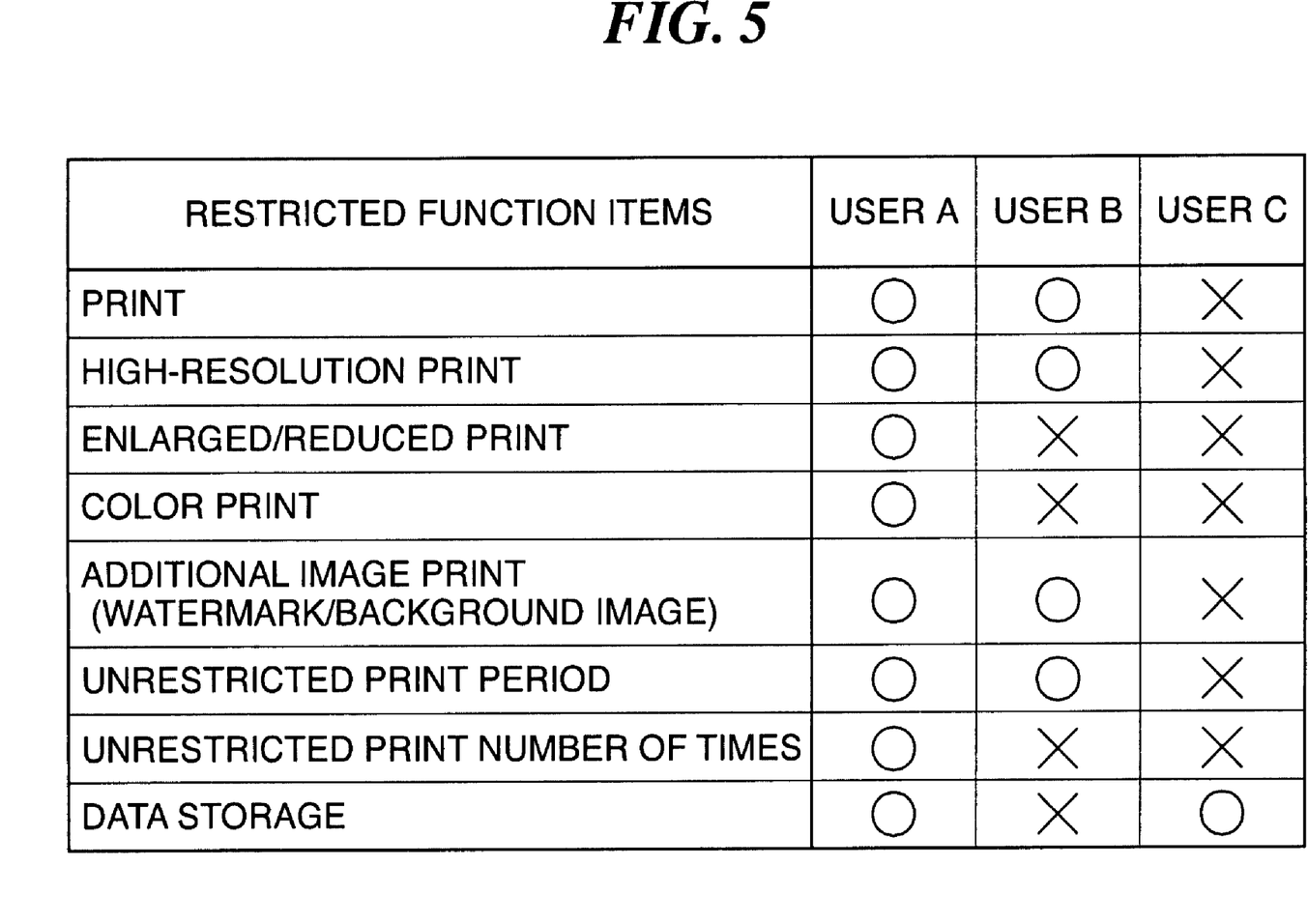
FIG. 5 is a diagram showing a table of the relationship between users and contents of access tickets registered in a user DB appearing in FIG. 4.

The user DB 220 has registered therein user-related information, which, for example, include: data purchase information indicating what DRM image data in the DRM image DB 210 has been accessed and/or purchased by users and including collection information on purchase costs of the purchased DRM image data; user specifying information for specifying users, such as passwords set by users and used for accessing the purchased DRM image data (contents); contents of access tickets indicating detailed access restriction information for respective DRM image data (contents) as shown in FIG. 5 described later; and device specifying information for specifying user terminals used by users for printing, for example, the PC 300a, the printer driver 400, and the MFP 300b.

In the log DB 230, information indicating operations carried out by users are recorded as log information. The log information indicates, for example, when, from where and by which user the DRM image DB 210 has been accessed, to what size the DRM image data has been reduced or enlarged and where (in which user terminal) the data is stored, whether the copyright protection implemented on the stored DRM image data has been removed, whether image data from which the copyright protection has been removed has been printed, and whether a file in which the DRM image data is stored has been opened and closed.

The content management server 200 manages those pieces of image data stored in the DRM system 1000 for which the copyright protection is required, that is, the image data internally stored, and pieces of image data stored in the connected user terminals 300a, 300b. At this time, the content management server 200 manages each of these pieces of image data in the form of DRM image data that has been produced by conversion to a DRM format, so that these pieces of image data remain copyright protected. Note that so long as the image data distributed to users (i.e., downloaded by users) is DRM image data, the conversion of the respective image data to DRM format may be carried out by any of the PC 100a, the content management server 200, the PC 300a, and the MFP 300b.

By way of example, as the DRM format, there can be used XML (Extensible Markup Language) format or VFZ (Vector Format for Zooming) format that uses a special compression technique. Out of these formats, VFZ format should preferably be used. By using VFZ format as the DRM format of the DRM image data, high-resolution and high-quality DRM image data with no jaggies can be generated from image data of a predetermined format, and the size of the DRM image data can be reduced by means of the special compression technique, whereby the load for handling the DRM image data in the content folder 100 can be reduced.

In the content folder 100, the client registers image data in the content management server 200, and acquires the data purchase information and the log information from the content management server 200. Additional user information, such as information indicating whether some user has accessed a website of the client can also be registered in the user DB 220 of the content management server 200.

Figure 2:
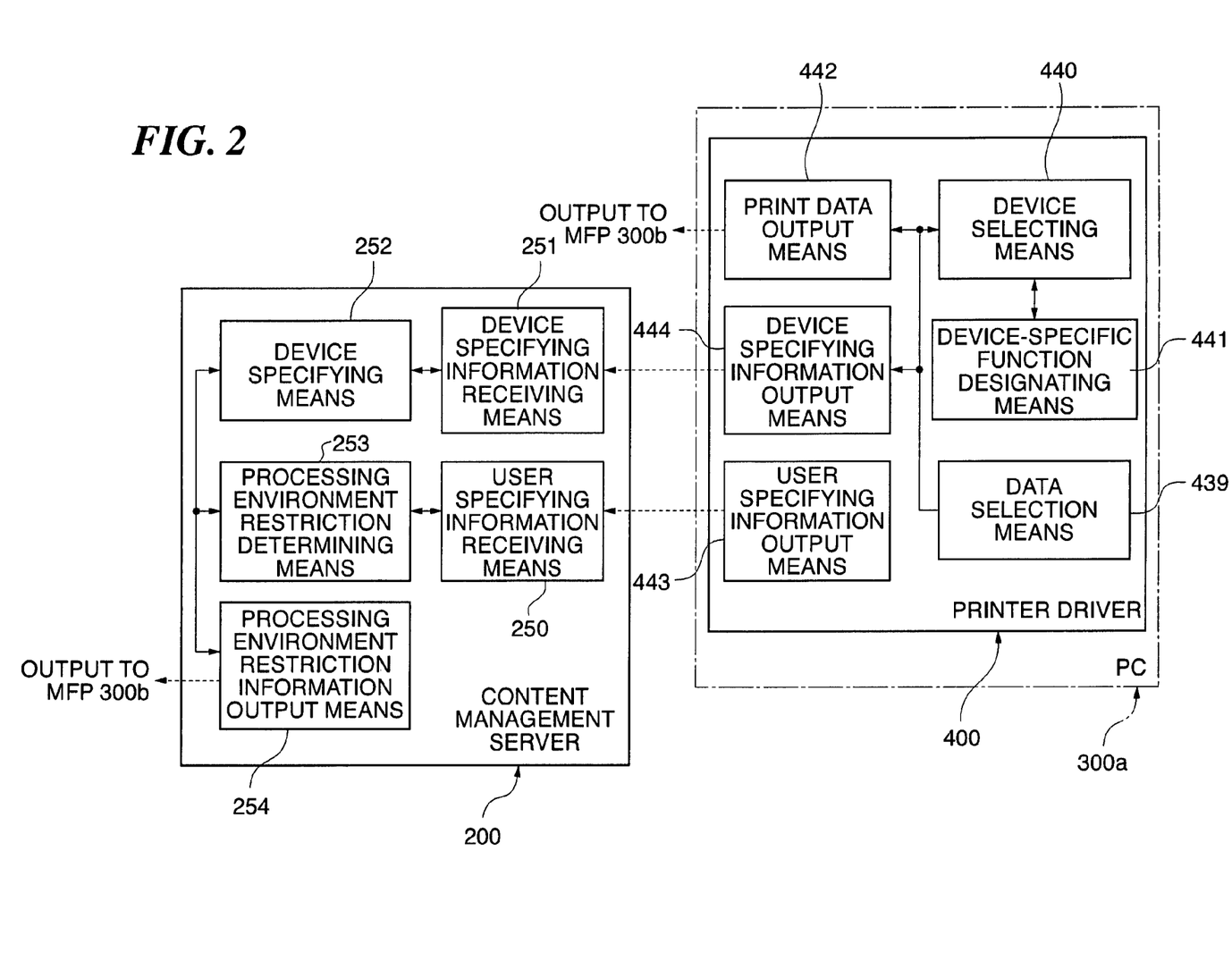
FIG. 2 is a block diagram showing the construction of a printer driver and a content management server appearing in FIG. 1.

FIG. 2 is a block diagram showing the constructions of the printer driver 400 and the content management server 200 appearing in FIG. 1.

As shown in FIG. 2, the printer driver 400 is comprised of: a data selecting means 439 that selects DRM image data to be subjected to image processing such as a print process in FIG. 9, described later, and/or a storage process in FIG. 10, described later, by designating a data name that is unique to each DRM image data and/or a serial number uniquely assigned to each DRM image data; a device selecting means 440 that selects, as the image processing device to carry out the image processing (hereinafter, referred to as the "device"), the MFP 300b, for example, that is connected to the PC 300a via the network; a device-specific function designating means 441 that provides the MFP 300b selected by the device selecting means 440 with instructions relating to print processing for carrying out an optional discharging/feeding function and/or a finishing process function that are specific to the MFP 300b; a print data output means 442 that outputs the DRM image data remaining copyright protected as print data to the MFP 300b; a user specifying information output means 443 that outputs the user specifying information for specifying a user who outputs the DRM image data as print data; and a device specifying information output means 444 that outputs the device specifying information for specifying the MFP 300b, which stores the DRM image data including print data in a state where the user can remove the copyright protection and/or which prints an image corresponding to the print data. The device specifying information output means 444 also outputs data specifying information such as a data name or serial number for specifying the DRM image data to be subjected to image processing. The user specifying information, device specifying information, and data specifying information outputted from the printer driver 400 are stored in the content management server 200. The device specifying information includes an IP address set on a network included in the DRM system 1000 and a name of the MFP 300b.

As shown in FIG. 2, the content management server 200 is comprised of: a user specifying information receiving means 250 that receives the user specifying information; a device specifying information receiving means 251 that receives the device specifying information; a device specifying means 252 that specifies a device, for example the MFP 300b, based on the device specifying information and specifies the DRM image data to be subjected to image processing based on the data specifying information; a processing environment restriction determining means 253 that specifies a user by searching through the user information registered in the user DB 220 for the received user specifying information, and determines, based on the specified user and the specified DRM image data, the content of the access ticket shown in FIG. 5, described later, such as the content of print environment restrictions indicating a print environment; and a processing environment restriction information output means 254 that generates, based on the content of the print environment restrictions determined by the processing environment restriction determining means 253, an access ticket (regulation information) for restricting a print environment to be created by the MFP 300b and/or other environment and outputs the access ticket to the MFP 300b.

The access ticket includes permission information or inhibition information. The permission information indicates, when the processing environment restriction determining means 253 has specified a user based on the user specifying information, that the specified user is permitted to access the DRM image data, that is, the MFP 300b selected by the user is permitted to carry out image processing. The inhibition information inhibits, when the processing environment restriction determining means 253 cannot specify a user, access by the user who is attempting to access the DRM image data and instructs the MFP 300b that image processing is inhibited.

The respective means of the printer driver 400 and the content management server 200 shown in FIG. 2 are implemented by modules that are principally composed of parts that can be realized by software and/or by ASICs (Application Specific Integrated Circuits) that are LSIs (Large Scale Integration) dedicated to image processing, as well as parts that can be realized by hardware.

Figure 3:
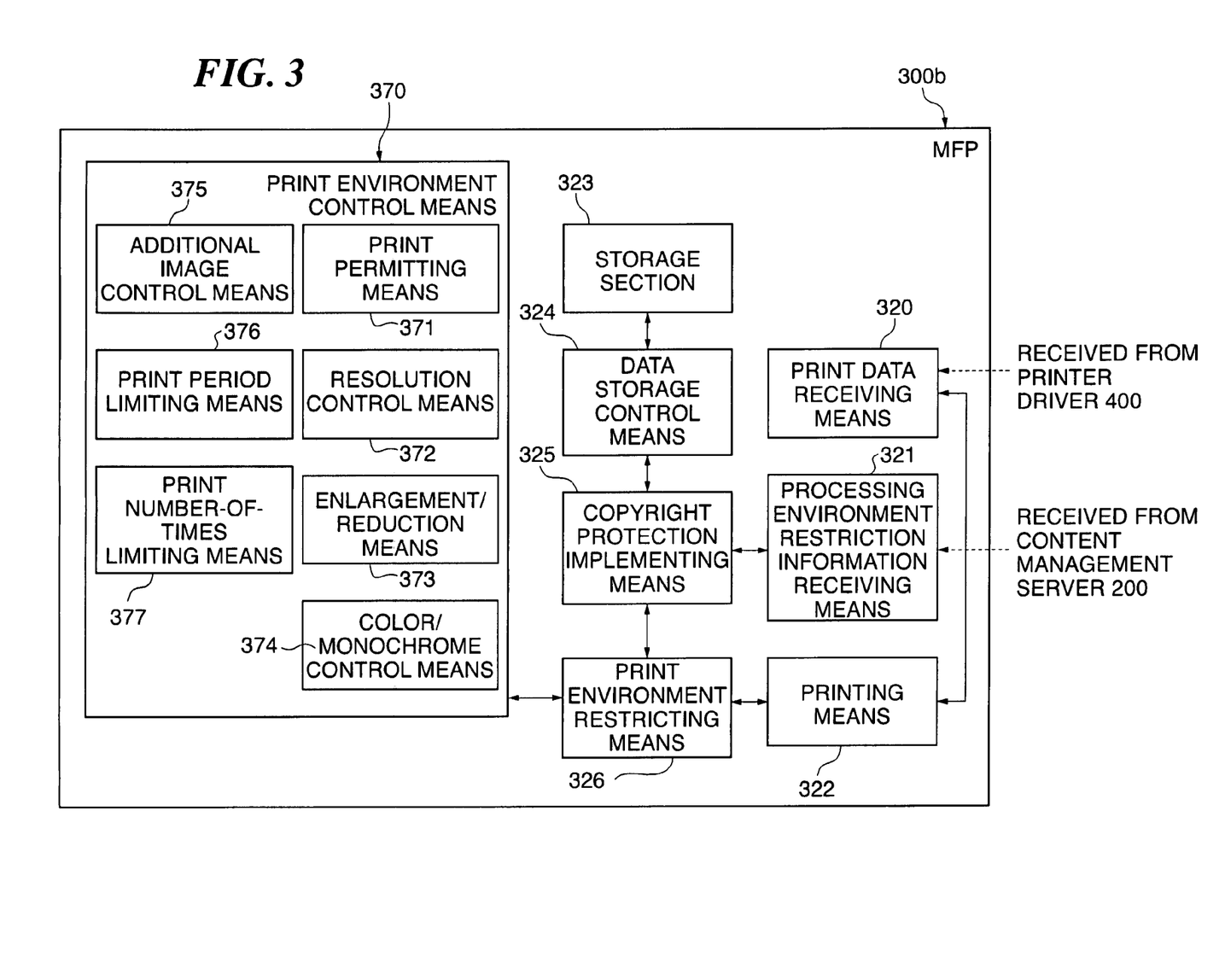
FIG. 3 is a block diagram showing the construction of a MFP appearing in FIG. 1.

FIG. 3 is a block diagram showing the construction of the MFP 300b appearing in FIG. 1.

As shown in FIG. 3, the MFP 300b is comprised of: a print data receiving means 320 that receives print data from the printer driver 400; a processing environment restriction information receiving means 321 that receives an access ticket (information on print environment restrictions or the like) from the content management server 200; a printing means 322 that prints an image corresponding to the print data; storage section 323 composed of a RAM (Random Access Memory) or a HDD (Hard Disk Drive) that stores the print data in accordance with a storage process execution instruction from the user; a data storage control means 324 that determines whether the storage section 323 is permitted to store the DRM image data in a state where the copyright protection can be removed; a copyright protection implementing means 325 that cooperates with the DRM controller 240 of the content management server 200 to carry out control to implement the copyright protection on the DRM image data; a print environment restricting means 326 that controls the print environment in accordance with instructions from the copyright protection implementing means 325; and a print environment control means 370 that restricts the print environment specifically to within a range of the content of the access ticket in accordance with instructions from the print environment restricting means 326. The data storage control means 324 operates in accordance with instructions from the copyright protection implementing means 325.

The print environment control means 370 is comprised of: a print permitting means 371 that permits execution of a print process for the print data or provides a restriction to inhibit execution of the print process; a resolution control means 372 that changes the resolution of the print data for execution of the print process; an enlargement/reduction control means 373 that carries out enlargement/reduction of the DRM image data, that is, changes the enlargement ratio/reduction ratio of the DRM image data; a color/monochrome control means 374 that switches the color of the image corresponding to the print data between color and monochrome; an additional image control means 375 that adds, to the print data, additional image data that is a "watermark" and/or a background image, for the purpose of indicating a usage restriction on the resulting printed image, for example, to indicate that a printout is a sample; a print period limiting means 376 that limits (measures) a time period where the MFP 300b can execute the print process on the DRM image data; and a print number-of-times limiting means 377 that limits (counts) the number of times the MFP 300b can print the DRM image data.

The respective means of the MFP 300b shown in FIG. 3 are implemented by modules that are principally composed of parts that can be realized by software and/or parts that can be realized by ASICs that are LSIs dedicated to image processing, as well as parts that can be realized by hardware.

According to the construction of FIG. 3, the MFP 300b can operate so that during the storage process, the data storage control means 324 can determine whether storage of the DRM image data in the storage section 323 is permitted, and during the print process, the print environment restricting means 326 controls, via the print environment control means 370, specific restrictions on the print environment using the respective means 371 to 377.

The operation of the DRM system 1000 shown in FIG. 1 will now be described.

Figure 4:
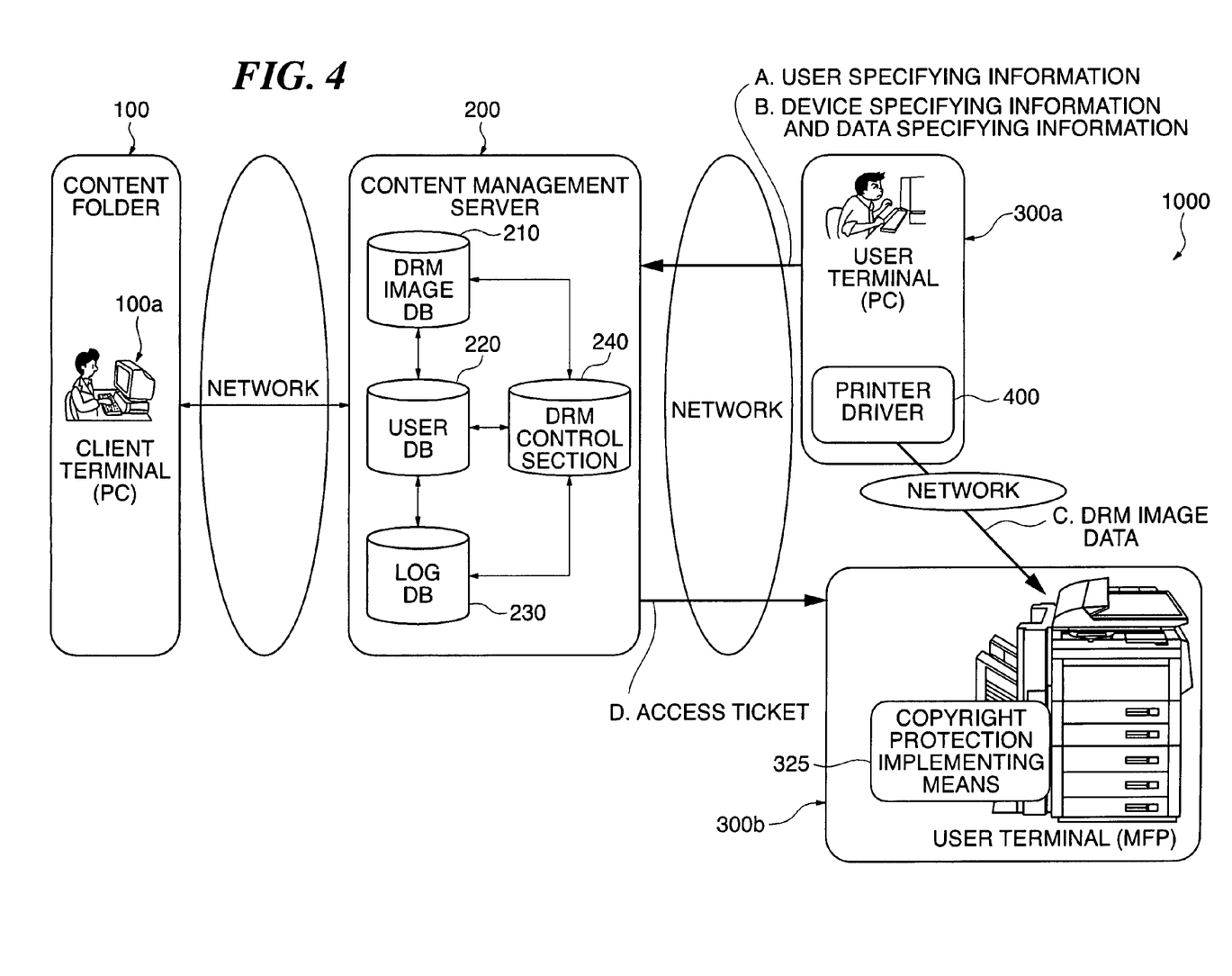
FIG. 4 is a block diagram useful in explaining the operation of a DRM system as the image processing system in FIG. 1.

FIG. 4 is a block diagram useful in explaining the operation of the DRM system 1000 shown in FIG. 1.

Referring to FIG. 4, in the DRM system 1000, first the client registers, via the PC 100a, image data to be distributed to users in the DRM image DB 210. The DRM controller 240 implements the copyright protection on the registered image data by converting the image data to DRM format to produce DRM image data, and deletes the image data registered by the client for which the copyright protection has not been implemented. Note that when the image data registered by the client is DRM image data for which the copyright protection has been implemented in advance, the DRM controller 240 may only need to confirm the format of the data.

A plurality of DRM image data are distributed from clients to users, for example at no charge. Each individual user searches the DRM image DB 210 for DRM image data corresponding to desired DRM image data out of the plurality of distributed DRM image data, and purchases the desired DRM image data. Note that the DRM image data distributed for free before purchasing and the DRM image data after purchasing differ in that before purchasing, it is only possible to view sample images corresponding to the DRM image data, for example, and image processing is not possible, but after purchasing, the copyright protection implemented on the DRM image data is removed and the image processing described later can be carried out within a predetermined range. When the DRM image data is purchased, a user ID issued by the client and a password freely chosen by the user, for example, are registered in the user DB 220 as the user specifying information and the client registers, for respective users, registers the contents of the access tickets shown in FIG. 5, described later, that have been determined based on purchase prices paid by the users, for example. The user DB 220 stores the contents of access tickets with the respective DRM image data associated with one or more users who have purchased the DRM image data.

The communication system disclosed herein includes, for example, the MFP 300b that is one example of the image processing apparatus that carries out predetermined image processing on DRM image data that is one example of a protected image that has been subjected to a predetermined protection process, the PC 300a that is one example of an information processing apparatus that transfers a DRM image to the MFP 300b to carry out image processing, and the content management server 200 that is one example of an authentication server that issues user specifying information as one example of authentication information.

The PC 300a transmits the DRM image data to the MFP 300b and transmits, to the content management server 200, the device specifying information and the user specifying information indicating the user or PC name that has issued a print instruction.

The content management server 200 includes the processing environment restriction information output means 254 that is one example of issuing means that obtains the user specifying information transmitted from the PC 300a and issues, to a specified user or terminal, an access ticket indicating that a predetermined range of processing is permitted for the DRM image data, as shown in FIG. 5 and the like. The functions of the processing environment restriction information output means 254 are realized by a processing environment restriction information outputting program.

The MFP 300b includes the print environment restricting means 326 that is one example of a regulating means that obtains the DRM image data transmitted from the PC 300a and, based on the access ticket (signal D in FIG. 4) issued by the processing environment restriction information outputting program of the content management server 200, regulates a content of predetermined image processing to within a predetermined range specified by the access ticket. The functions of the print environment restricting means 326 are realized by a print environment restricting program.

FIG. 5 is a diagram showing a table of the relationship between the contents of access tickets and users registered in the user DB 220 shown in FIG. 4. Note that "restricted-function items" shown in FIG. 5 refer to restricted function items of the MFP 300b that can be restricted by the access ticket, with circles showing that the functions concerned are permitted to be executed and crosses showing that such functions are inhibited from being executed.

As shown by way of example in FIG. 5, the restricted-function items include "print" for enabling/disenabling the print process shown in FIG. 9, described later, "high-resolution print" for printing at high resolution that can be set as permitted via the resolution control means 372, "enlarged/reduced print" for printing with enlargement/reduction that can be set as permitted via the enlargement/reduction means 373, "color print" for color printing that can be set as permitted via the color/monochrome control means 374, "additional image print" for printing, together with print data, additional image data such as a watermark or a background image added to the print data, wherein the additional image data can be set as permitted via the additional image control means 375, "unrestricted print period" for removing a restriction on the period during which the print process can be carried out, which can be set as permitted via the print period limiting means 376, "unrestricted number of times of print" for removing a restriction on the number of times of execution of the print process, which can be set as permitted via the print number-of-times limiting means 377, and "data storage" for enabling only a user who has successfully completed password authentication to store DRM image data in the MFP 300b in a state where the copyright protection can be removed. The item "data storage" corresponds to the storage process shown in FIG. 10, described later. Note that when "color print" is inhibited, the print data is printed in monochrome.

As shown in FIG. 5, the contents of the access tickets set for the same piece of DRM image data differ between users A, B, and C.

For example, the user A, who is permitted to carry out every function specified on the access ticket, can freely carry out image processing on the purchased DRM image data once the password authentication is completed. In this case, the password authentication may even be omitted.

The user B, who is not permitted to carry out enlarged/reduced printing or color printing, can therefore print an image of the size distributed from the client in monochrome. The user B is not permitted to store data, either, and therefore can have the DRM image data stored in the storage section 323 of the MFP 300b only in a state where the copyright protection cannot be removed. Additionally, the user B is not permitted to have an unrestricted number of times of execution of print and therefore can carry out the print process only the number of times set in advance by the client.

The user C is only permitted to store the DRM image data in the MFP 300b and is not permitted to carry out the print process. The copyright protection can be removed from the stored DRM image data, if password authentication is successful. In other words, for example, a plurality of users having the same password can view an image corresponding to the DRM image data, which makes it possible to improve user friendliness, i.e. operability for users. Devices that correspond to the user C include the DRM image DB 210 and the PC 300a.

In addition, the content of the access ticket shown in FIG. 5 includes a DRM key, not shown, and described later, for removing the copyright protection of the DRM image data.

In the DRM system 1000, a DRM format is used for managing the DRM image data, and thus by setting the restricted function items of the MFP 300b as shown in FIG. 5, the client can precisely restrict print settings for DRM image data and permission/inhibition settings for the storage of DRM image data for respective users. That is, since the client can manage the DRM image data in the user terminals 300a, 300b via the content management server 200, it is possible to prevent unauthorized use, such as copying, by users of DRM image data or of images corresponding to the DRM image data. The client can therefore realize a business that offers fee-based delivery services of DRM image data.

Figure 6:
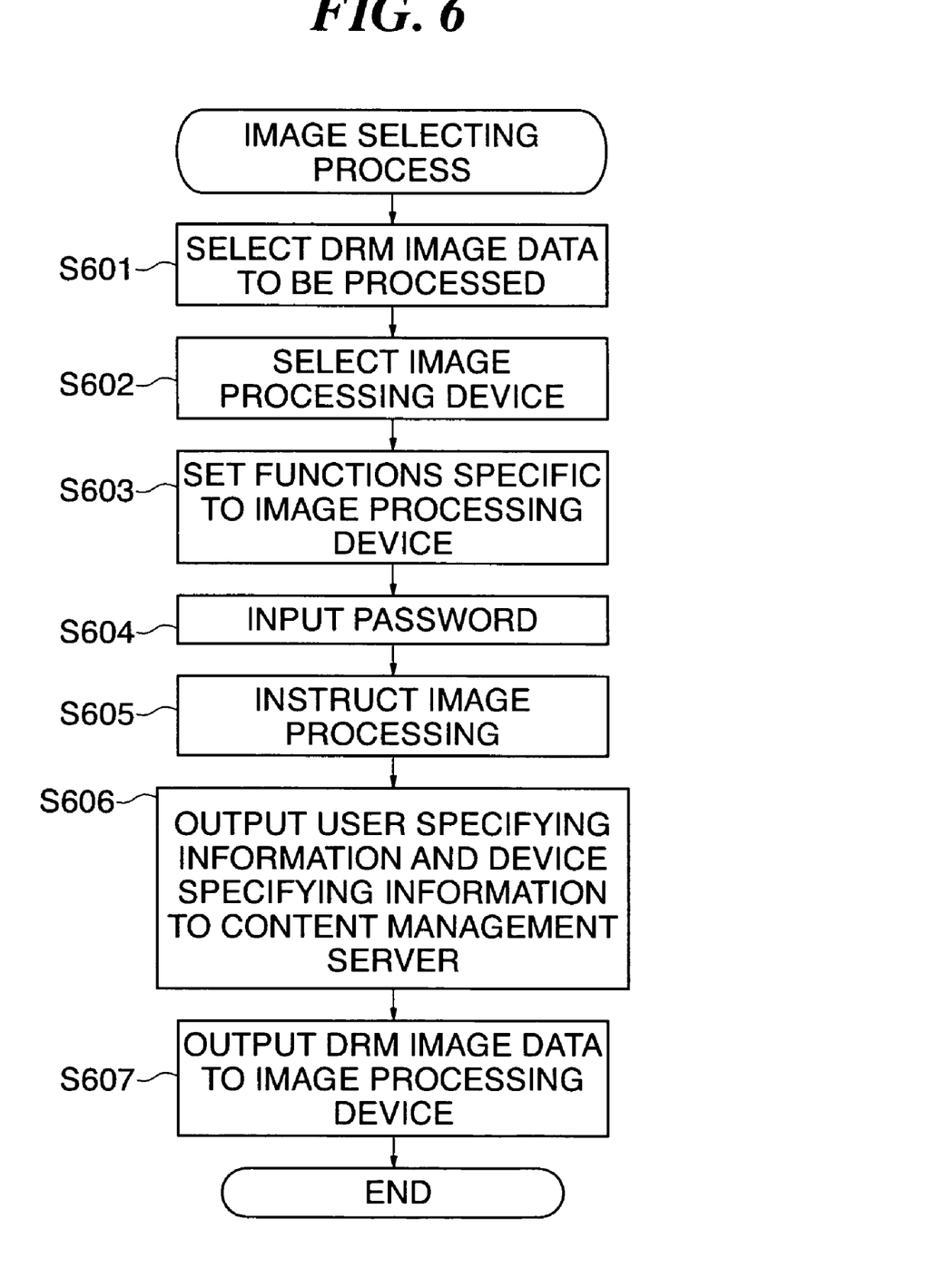
FIG. 6 is a flowchart showing the procedure of an image selecting process carried out by a PC appearing in FIG. 4.

FIG. 6 is a flowchart showing the procedure of an image selecting process executed by the PC 300a in FIG. 4.

Referring to FIG. 6, the user selects DRM image data to be subjected to image processing (the print process and/or storage process) described later on a display screen of the PC 300a, for example (step S601), and selects the MFP 300b, for example, as the device to carry out the image processing on the DRM image data using the device selecting means 440 (step S602). Note that to select the DRM image data, the user may download DRM image data from the content folder 100 or the content management server 200 in a state where the data is copyright protected, or the user may directly access the content folder 100 and the content management server 200 without downloading into the PC 300*a*.

Next, in a step S603, the user sets processing functions specific to the MFP 300*b*, for example print functions, using the device-specific function designating means 441. Setting items of specific print functions include sheet feeding position, number of copies, range of print pages, print orientation, enlargement/reduction, rotation, layout (the number of pages per printing sheet), resolution, sheet size, sheet type, sheet discharging position, finishing process type, and the like. Setting items of storage functions as specific processing functions include permission/inhibition of removal of the copyright protection implemented on the stored DRM image data, and a storage period for the stored DRM image data and permission/inhibition of copying, deletion, overwriting, and the like.

After this, the user inputs a password via the printer driver 400 (step S604) and instructs the MFP 300*b* to carry out image processing (step S605). Note that the printer driver 400 may be constructed to input a user ID in addition to the password. When it is determined that execution of only the print process or execution of the print process and the storage process has been instructed as the image processing, the process proceeds to processing shown in FIG. 9, described later. When it is determined that only the storage process has been instructed, the process proceeds to processing shown in FIG. 10, described later. The just-mentioned determinations are carried out by processing shown in FIG. 8, described later.

When execution of image processing has been instructed, in step S606, the user specifying information output means 443 of the printer driver 400 outputs the inputted password and the like to the content management server 200 as the "user specifying information" (signal A in FIG. 4), whereas the device specifying information output means 444 outputs "data specifying information" such as a data name and "device specifying information" specifying the MFP 300*b* (signal B in FIG. 4) to the content management server 200.

The user specifying information, the data specifying information, and the device specifying information should preferably be transmitted at a time by e-mail via the network using TCP. The e-mail includes information such as a password, user ID, or e-mail address of the user corresponding to the user ID for specifying the user who is the sender, an e-mail address of the content management server 200 that is the recipient, an e-mail address of the MFP 300*b* that carries out the print process when the image processing is the print process, and the data name of the DRM image data to be subjected to the image processing.

In parallel with the execution of the step S606, the print data output means 442 of the printer driver 400 outputs the DRM image data to be subjected to image processing (signal C in FIG. 4) to the MFP 300*b*, together with the settings of the processing functions set in step S603 (step S607), and then the process is terminated.

According to the process in FIG. 6, the PC 300*a* equipped with the printer driver 400 transmits the user specifying information together with the data specifying information and the device specifying information to the content management server 200 (step S606), whereby it is possible to improve the user friendliness. Since it is unnecessary to provide the printer driver 400 in the content management server 200, the user can instruct the execution of image processing from the PC 300*a* (step S605), making it possible to improve the user friendliness. When the image processing is the print process, it is possible to set process functions specific to the MFP 300*b* so as to have images printed with full use being made of the sheet feeding/discharging options of the MFP 300*b* (step S603), whereby it is possible to improve the operability of the print process.

Figure 7:
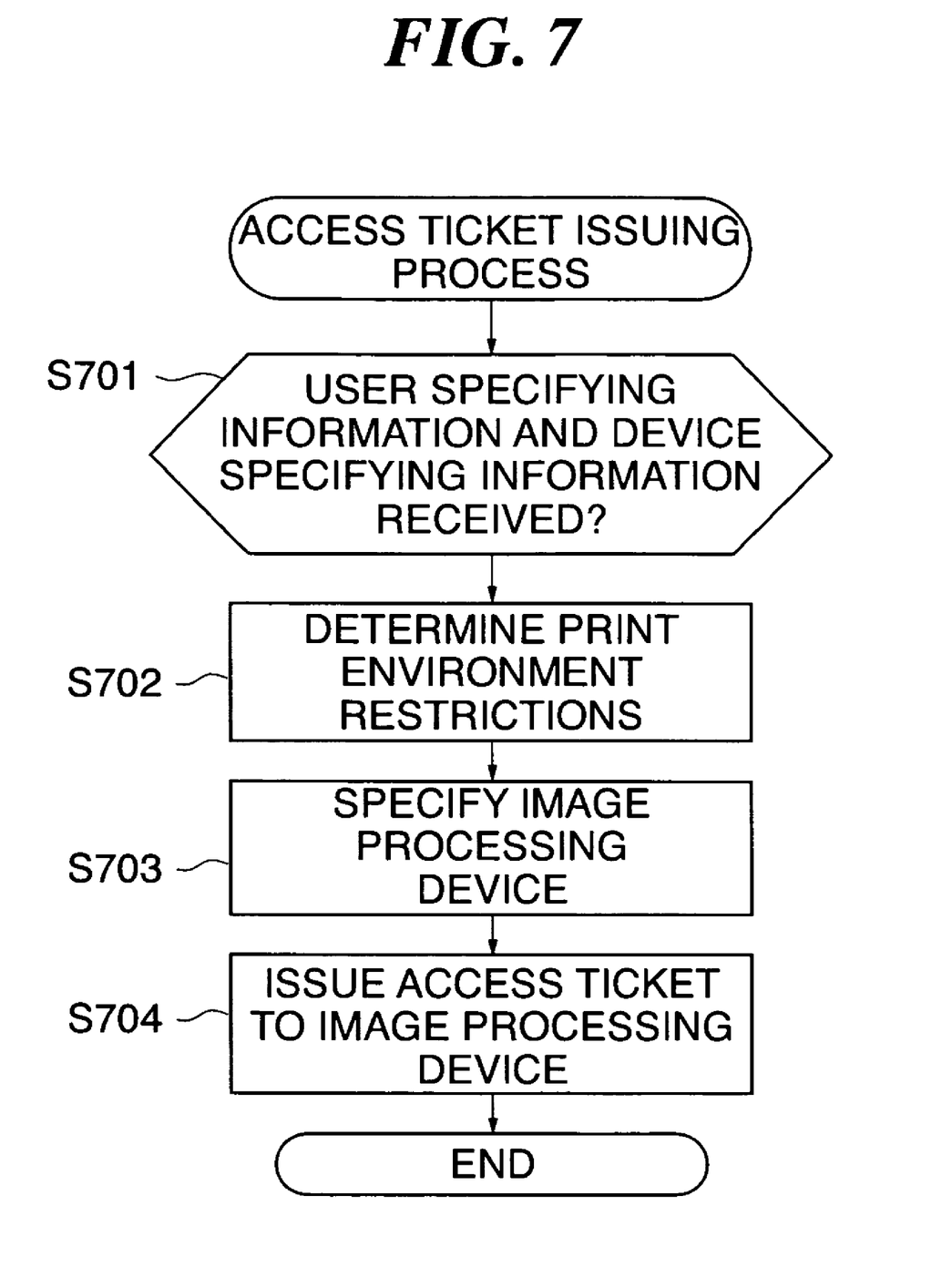
FIG. 7 is a flowchart showing the procedure of an access ticket issuing process carried out by a DRM control unit of the content management server appearing in FIG. 4.

FIG. 7 is a flowchart showing the procedure of an access ticket issuing process executed by the DRM controller 240 of the content management server 200 shown in FIG. 4.

Referring to FIG. 7, first, the DRM controller 240 of the content management server 200 determines whether the user specifying information has been received, using the user specifying information receiving means 250, and determines whether the device specifying information has been received, using the device specifying information receiving means 251. If "YES" to the step S701, in the next step S702, the DRM controller 240 specifies the user and the data name of the DRM image data to be subjected to image processing based on the user specifying information and the data specifying information, and causes the processing environment restriction determining means 253 to search the table shown in FIG. 5 to determine the content of the print environment restrictions (the access ticket) corresponding to the specified user and data name.

In the processing in the step S703, the device specifying means 252 specifies the MFP 300*b* based on the received device specifying information. Note that the processing in the steps S702 and S703 are carried out in parallel.

Next, in a step S704, the processing environment restriction information output means 254 is caused to generate information (regulation information) for restricting the print environment for the MFP 300*b* based on the content of the print environment restrictions determined by the processing environment restriction determining means 253. Then, the output means 254 is caused to output the information as the print environment restriction information (signal D in FIG. 4) to the MFP 300*b* specified by the device specifying means 252. That is, an access ticket is issued to the MFP 300*b*. The access ticket should preferably be transmitted via the network (TCP) using e-mail ("DRM key by e-mail" described later).

According to the process in FIG. 7, since the content management server 200 merely issues the access ticket to the MFP 300*b* (step S704), the server 200 is not required to communicate with the MFP 300*b* to obtain the device specifying information of the MFP 300*b* whenever image processing is carried out, and therefore the load upon the content management server 200 in the DRM system 1000 can be reduced. Accordingly, the content management server 200 can principally perform management of the DRM image data, whereby the performance of the content management server 200 in the DRM system 1000 can be improved.

The content management server 200 transmits, to the MFP 300*b*, the access ticket that includes a DRM key for enabling the DRM image data to be reproduced as image data that can be processed by the MFP 300*b*. A method of generating the DRM key will now be described below.

When the image processing is the print process, the DRM key is used to restore (decompress and/or decrypt) the DRM image data to image data from which the copyright protection has been completely removed, and also is used to protect (compress and/or encrypt) the restored image data by converting the same once again into DRM image data. When the image processing is the storage process, the DRM key is used to restore the DRM image data so that the DRM image data is stored in a state such that only a specified user can remove the copyright protection implemented on the DRM image data by carrying out password authentication, for example.

The content management server 200 generates the DRM key such that it corresponds to the MFP 300b selected by the device selecting means 440 based on the device specifying information received from the printer driver 400, and transmits the generated DRM key to the MFP 300b via the network (TCP) using e-mail (hereinafter referred to as "the DRM key by e-mail"). The MFP 300b removes the copyright protection implemented on the DRM image data based on a key removal method included in the content of the DRM key by e-mail received from the content management server 200. The DRM key is stored in the storage section 323 so that the DRM key can be used any number of times by the user undergoing password authentication, within a range of the restrictions on the print period and print number of times of print.

Figure 8:
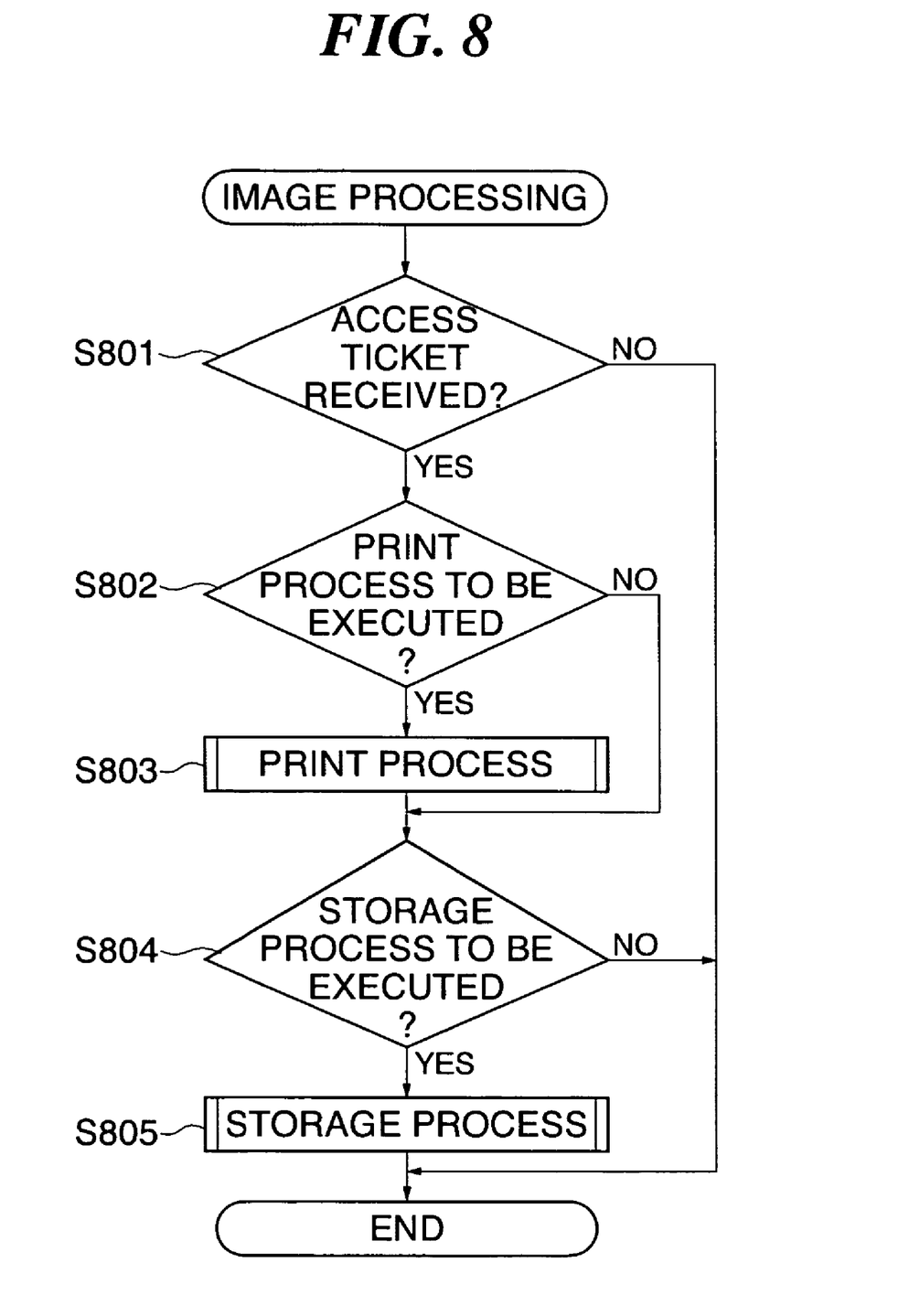
FIG. 8 is a flowchart showing the procedure of image processing carried out by the MFP appearing in FIG. 4.

FIG. 8 is a flowchart showing the procedure of the image processing carried out by the MFP 300b shown in FIG. 4.

Referring to FIG. 8, the MFP 300b determines whether the processing environment restriction information receiving means 321 has received the access ticket including the DRM key from the content management server 200. If "YES" to the step S801, in a step S802, it is determined whether the image processing execution instruction from the printer driver 400 is a print process execution instruction for the DRM image data received from the PC 300a. When the instruction is the print process execution instruction, the process proceeds to a step S803 where the print process shown in FIG. 9, described later, is carried out. When the instruction is not the print process execution instruction, the process skips the step S803 and proceeds to a step S804.

Then, in the step S804, it is determined whether the image processing execution instruction from the printer driver 400 is a storage process execution instruction for the DRM image data received from the PC 300a. When the instruction is the storage process execution instruction, the process proceeds to a step S805 where the storage process shown in FIG. 10, described later, is carried out, and the present process is terminated. When the instruction is not the storage process execution instruction, the step S805 is skipped and the present process is terminated.

Figure 9:
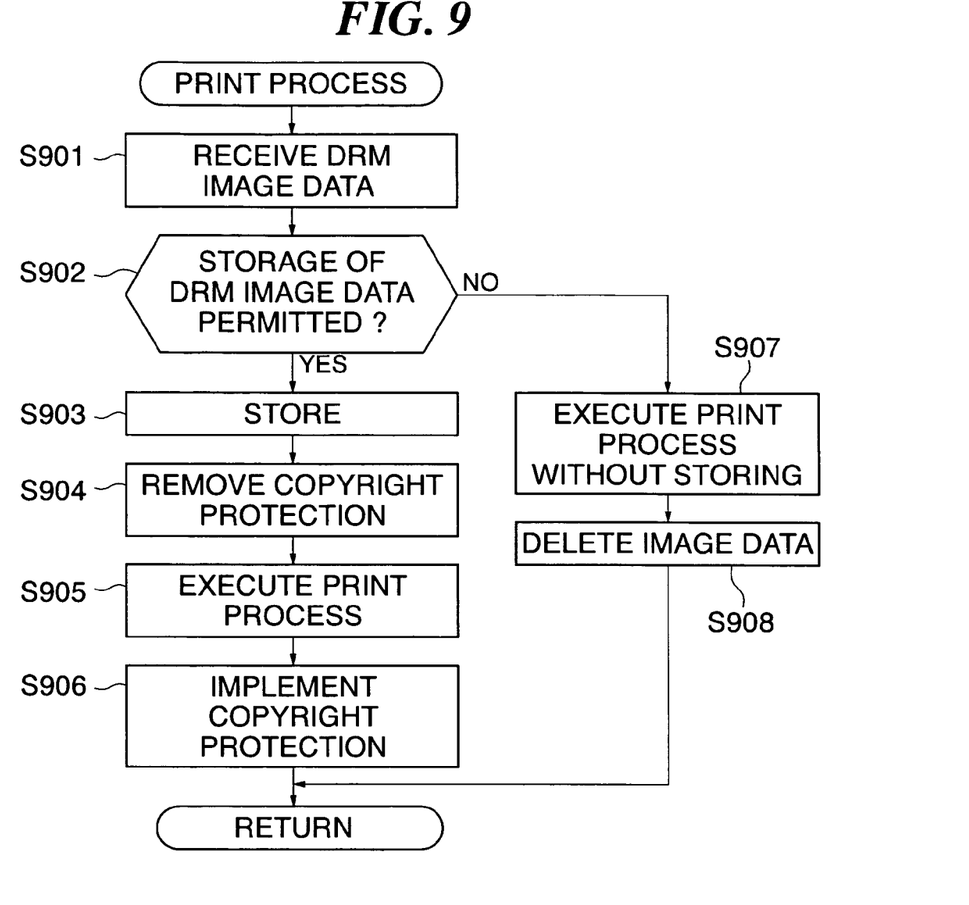
FIG. 9 is a flowchart showing the procedure of a print process carried out in a step S803 in FIG. 8.

FIG. 9 is a flowchart showing the procedure of the print process carried out in the step S803 in FIG. 8.

In FIG. 9, the MFP 300b receives the DRM image data (signal C in FIG. 4) from the printer driver 400 and the settings of the print functions specific to the MFP 300b set in the step S603 by the print data receiving means 320 (step S901). The copyright protection implementing means 325 is caused to determine whether the access ticket (print environment restriction information) received from the content management server 200 in the step S801 includes the content that permits the DRM image data to be stored in the storage section 323 in a state where the copyright protection can be removed (step S902). When storage of the DRM image data is permitted, the process proceeds to a step S903, while when storage is inhibited, the process proceeds to a step S907.

Then, in the step S903, the DRM image data is stored in the storage section 323 in a state where the copyright protection can be removed. Note that the MFP 300b is constructed so that execution of the print process on the stored DRM image data is permitted by another access ticket, for example.

After this, the MFP 300b removes the copyright protection implemented on the stored DRM image data (step S904). The printing means 322 then carries out the print process for the image data corresponding to the DRM image data from which the copyright protection has been removed based on the settings for the print functions set in the step S603 (step S905).

When the execution of the print process is complete, the copyright protection is implemented on the image data by the copyright protection implementing means 325 (step S906), and the process is terminated.

Note that the image data on which the copyright protection has been implemented in the step S906 (the DRM image data) may be overwritten on the DRM image data already stored in the storage section 323 or may be stored separately. Alternatively, the copyright protection implementing means 325 may implement the copyright protection by leaving the DRM image data stored in the storage section 323 as it is and deleting the image data used in the print process.

When a result of the determination in the step S902 indicates that storage of the DRM image data is inhibited, the MFP 300b first removes the copyright protection implemented on the DRM image data using the copyright protection implementing means 325 without storing the DRM image data in the storage section 323 in a state where the copyright protection can be removed. Next, the printing means 322 carries out the print process on the print data corresponding to the DRM image data from which the copyright protection has been removed based on the settings for the print functions set in the step S603 (step S907) and deletes the print data used in the print process (step S908), thereby completing the present process. It should be noted that in the processing of the step S908, in addition to the image data used in the print process, the corresponding DRM image data may be deleted.

According to the process in FIG. 9, the copyright protection implemented on the DRM image data is removed immediately before the print process is executed (steps S904, S907), whereby the security of the DRM image data in the MFP 300b can be improved.

Since image data corresponding to the DRM image data from which the copyright protection has been removed is deleted during execution of the print process (steps S906 and S907), the security of the DRM image data and the image data corresponding thereto in the MFP 300b can be further improved.

Note that when the result of the determination in the step S902 of FIG. 9 indicates that storage of the DRM image data is permitted, the present process may be terminated without returning to the process in FIG. 8.

In the processing in the steps S905, S907 described above, when the print environment restrictions for the print data received from the printer driver 400 and the processing functions specific to the MFP 300b are not within the range of the content of the access ticket received from the content management server 200 in the step S801, removal of the copyright protection implemented on the DRM image data is inhibited and the image processing (the print process) is suspended. Note that the suspension of the image processing should preferably be notified to the user and/or displayed on a display screen of the PC 300a.

Figure 10:
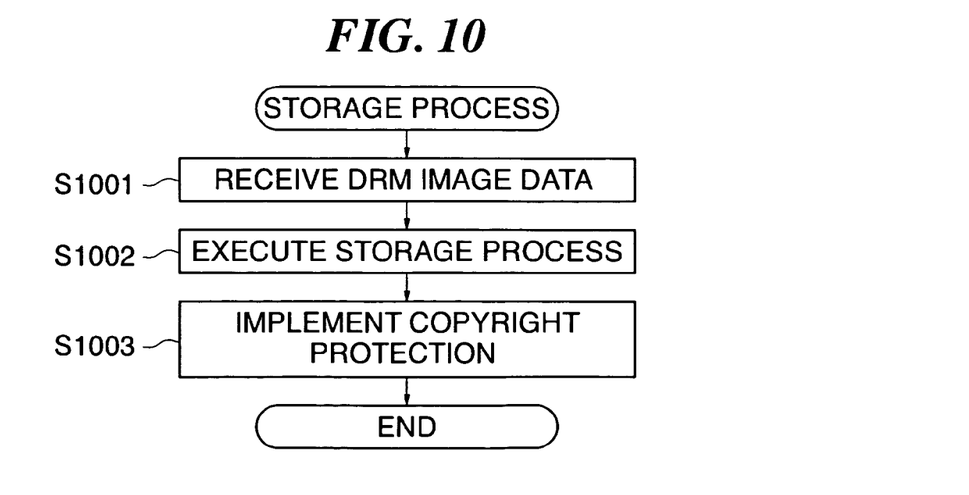
FIG. 10 is a flowchart showing the procedure of a storage process carried out in a step S805 in FIG. 8.

FIG. 10 is a flowchart showing the procedure of the storage process that is carried out in the step S805 in FIG. 8.

Referring to FIG. 10, the MFP 300b receives the DRM image data (signal C in FIG. 4) transmitted from the printer driver 400 (step S1001), and executes the storage process to store the DRM image data in the storage section 323 (step S1002). The copyright protection implementing means 325 implements the copyright protection on the DRM image data to produce a state where the copyright protection can be removed only by users for whom password authentication was successful (step S1003), and the process is then terminated.

According to the process in FIG. 10, since the copyright protection is implemented on the DRM image data (step S1003) not only in the print process but also in the storage process, the security of the DRM image data can be further improved.

In the processing in the step S1002 described above, when the instruction for carrying out the storage process on the print data received from the printer driver 400 does not match the content of the item "data storage" present in the access ticket received from the content management server 200 in the step S801, that is, when the data storage is inhibited according to the content of the access ticket, the DRM image data is inhibited from being stored in the state where the copyright protection can be removed. Note that the inhibition of the storage process should preferably be notified to the user and/or displayed on a display screen of the PC 300a.

According to the processes in FIGS. 9 and 10, the MFP 300b, which is a user terminal in the DRM system 1000, also includes a construction for implementing the copyright protection on image data, that is, the copyright protection implementing means 325 (see FIGS. 1, 3, and 4), and implements the copyright protection (steps S906, S908, and S1003) Thus, the range of the copyright protection of image data in the DRM system 1000 is extended and therefore the security of the DRM image data in the DRM system 1000 can be improved.

The respective processes in FIGS. 6 to 10 described above are recorded as logs in the log DB 230 of the content management server 200, whereby access to the DRM image data by a third party who has fraudulently carried out the password authentication can be recorded and therefore the security of the DRM system 1000 can be improved.

Although the image processing apparatus according to the above embodiment is applied to the MFP 300b selected via the printer driver 400 of the PC 300a, the PC 300a may select itself and carry out a storage process corresponding to the process in FIG. 10. When the PC 300a has selected itself, the PC 300a transmits the user specifying information and the device specifying information to the content management server 200 and receives the access ticket (the DRM key by e-mail) from the content management server 200. When the content management server 200 receives DRM image data from the content folder 100 and carries out a storage process corresponding to the process in FIG. 10, the user specifying information and data specifying information are transmitted to the PC 100a of the content folder 100 or the DRM controller 240 and the access ticket is received from the PC 100a or the DRM controller 240.

In the above embodiment, communication achieved by "DRM key by e-mail" using e-mail is given as an example of communication on the network between the PC 300a and the content management server 200. Alternatively, a HTTP (Hyper Text Transfer Protocol)-based two-way communication, or a Web-based or SOAP (Simple Object Access Protocol)-based communication may be used.

In the above embodiment, the image data is protected for copyright purposes, but the image data may be protected for any rights that are set by the client of the content folder 100.

Although conversion of the image data to DRM format is given in the above embodiment as an example of the copyright protection, alternatively, insertion of a copyguard into the image data, compression/encryption of the image data, or any combination of such may be carried out.

The image processing apparatus according to the above embodiment of the invention can be applied to an image forming apparatus such as an ink jet printer, a LFP (Large Format Printer) or a FAX apparatus that prints the DRM image data, and to an image storing apparatus (memory) such as a RAM or HDD that stores the DRM image data.

It is to be understood that the object of the present invention may also be accomplished by supplying a system or an apparatus with a storage medium (or recording medium) in which a program code of software which realizes the functions of the above described embodiment is stored, and causing a computer (or CPU or MPU) of the system or apparatus to read out and execute the program code stored in the storage medium.

In this case, the program code itself read out from the storage medium realizes the functions of the embodiment described above, and hence the program code and the storage medium in which the program code is stored constitute the present invention.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a RAM, a NV-RAM, a floppy (registered trademark) disk, a magnetic-optical disk, a CD-ROM, a MO, a CD-R, a CD-RW, a DVD (a DVD-ROM, a DVD-RAM, a DVD-RW, or a DVD+RW), a magnetic tape, a nonvolatile memory card, and a ROM.

Alternatively, the program may be supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2004-174489 filed Jun. 11, 2004, which is hereby incorporated by reference herein.

What is claimed is:
1. An image processing apparatus comprising:
a receiving unit configured to receive, from a client terminal, a protected image that has been subjected to a protection process, and receive, from a content management apparatus, an access ticket corresponding to a user that has issued a print instruction for the protected image;
a determining unit configured to determine whether or not the access ticket received by said receiving unit includes permission for the protected image;
a processing unit configured to remove protection implemented on the protected image received by said receiving unit, to carry out printing the image from which the protection is removed, to re-implement protection on the image from which the protection is removed, and to cause a storing apparatus to store the re-implemented image, when it is determined that the received access ticket includes the permission by said determining unit; and a deleting unit configured to remove the protection implemented on the protected image received by said receiving unit, to carry out printing the image from which the protection is removed, and to delete the image from which the protection is removed in order not to cause the storing apparatus to store the image from which the protection is removed, when it is determined that the received access ticket does not include the permission by said determining unit.

2. An image processing apparatus according to claim 1, wherein said processing unit is configured to implement the protection on a particular image in order to produce a state where the protection can be removed only by users for whom password authentication was successful, and to cause the storing apparatus to store the particular image having the protection implemented thereon.

3. An image processing apparatus according to claim 1, wherein the access ticket received by said receiving unit is issued, (a) after a content management server receives from a user terminal user specifying information for specifying the user which instructed printing for the protected image and data specifying information for specifying the protected image, and (b) after an authorized range of the protected image, which the user is authorized, is specified based on the received user specifying information and the received data specifying information, in order to restrict processing the protected image within the specified authorized range.

4. An image processing method comprising:
a receiving step of receiving, from a client terminal, a protected image that has been subjected to a protection process, and receiving, from a content management apparatus, an access ticket corresponding to a user that has issued a print instruction for the protected image;
a determining step of determining whether or not the access ticket received in said receiving step includes permission for the protected image;
a processing step of removing protection implemented on the protected image received in said receiving step, carrying out printing the image from which the protection is removed, re-implementing protection on the image from which the protection is removed, and causing a storing apparatus to store the re-implemented image, when it is determined that the received access ticket includes the permission in said determining step; and
a deleting step of removing the protection implemented on the protected image received in said receiving step, carrying out printing the image from which the protection is removed, and deleting the image from which the protection is removed in order not to cause the storing apparatus to store the image from which the protection is removed, when it is determined that the received access ticket does not include the permission in said determining step.

5. An image processing method according to claim 4, wherein said processing step further comprises implementing the protection on a particular image in order to produce a state where the protection can be removed only by users for whom password authentication was successful, and causing the storing apparatus to store the particular image having the protection implemented thereon.

6. An image processing method according to claim 4, wherein the access ticket received in said receiving step is issued, (a) after a content management server receives from a user terminal user specifying information for specifying the user which instructed printing for the protected image and data specifying information for specifying the protected image, and (b) after an authorized range of the protected image, which the user is authorized, is specified based on the received user specifying information and the received data specifying information, in order to restrict processing the protected image within the specified authorized range.

7. A non-transitory computer-readable storage medium storing a program that, when executed by one or more computers, causes the computer(s) to implement an image processing method, the method comprising:
a receiving step of receiving, from a client terminal, a protected image that has been subjected to a protection process, and receiving, from a content management apparatus, an access ticket corresponding to a user that has issued a print instruction for the protected image;
a determining step of determining whether or not the access ticket received in said receiving step includes permission for the protected image;
a processing step of removing protection implemented on the protected image received in said receiving step, carrying out printing the image from which the protection is removed, re-implementing protection on the image from which the protection is removed, and causing a storing apparatus to store the re-implemented image, when it is determined that the received access ticket includes the permission in said determining step; and
a deleting step of removing the protection implemented on the protected image received in said receiving step, carrying out printing the image from which the protection is removed, and deleting the image from which the protection is removed in order not to cause the storing apparatus to store the image from which the protection is removed, when it is determined that the received access ticket does not include the permission in said determining step.

8. A non-transitory computer-readable storage medium according to claim 7, wherein said processing step further comprises implementing the protection on a particular image in order to produce a state where the protection can be removed only by users for whom password authentication was successful, and causing the storing apparatus to store the particular image having the protection implemented thereon.

9. A non-transitory computer-readable storage medium according to claim 7, wherein the access ticket received in said receiving step is issued, (a) after a content management server receives from a user terminal user specifying information for specifying the user which instructed printing for the protected image and data specifying information for specifying the protected image, and (b) after an authorized range of the protected image, which the user is authorized, is specified based on the received user specifying information and the received data specifying information, in order to restrict processing the protected image within the specified authorized range.

* * * * *